United States Patent
Murai (10) Patent No.: US 7,907,165 B2
(45) Date of Patent: Mar. 15, 2011

(54) SPEAKER PREDICTING APPARATUS, SPEAKER PREDICTING METHOD, AND PROGRAM PRODUCT FOR PREDICTING SPEAKER

(75) Inventor: Kazumasa Murai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1314 days.

(21) Appl. No.: 11/449,674

(22) Filed: Jun. 9, 2006

(65) Prior Publication Data

US 2007/0120966 A1 May 31, 2007

(30) Foreign Application Priority Data

Nov. 24, 2005 (JP) .................................. 2005-339201

(51) Int. Cl.
*H04N 7/15* (2006.01)
(52) U.S. Cl. .................................................. 348/14.08
(58) Field of Classification Search ............... 348/14.08, 348/14.09
See application file for complete search history.

(56) References Cited

U.S. PATENT DOCUMENTS

| 2001/0052928 A1* | 12/2001 | Imagawa et al. ........... 348/14.12 |
| 2002/0101505 A1* | 8/2002 | Gutta et al. ................. 348/14.07 |

FOREIGN PATENT DOCUMENTS

JP A 2004-118314 4/2004

OTHER PUBLICATIONS

Murai et al.; "Face Detection for Multimodal Speech Recognition;" Information Processing Society of Japan, Special Interest Group of Spoken Language Processing, vol. 2002, No. 10, pp. 39-44, Feb. 1, 2002.

* cited by examiner

*Primary Examiner* — Stella L Woo
(74) *Attorney, Agent, or Firm* — Oliff & Berridge, PLC (57) ABSTRACT

A speaker predicting apparatus includes a speech detector that detects a person who is delivering a speech out of a plurality of persons, a feature extracting portion that extracts a feature in an image from the image in which the person is captured, a learning portion that learns the feature in the image occurring before the speech is detected by the speech detector, from the feature in the image, and a predicting portion that predicts the speaker out of the plurality of the persons, from the feature in the image in which the person is captured, with the use of a result learned by the learning portion.

16 Claims, 6 Drawing Sheets

SPEAKER PREDICTING APPARATUS, SPEAKER PREDICTING METHOD, AND PROGRAM PRODUCT FOR PREDICTING SPEAKER

CROSS-REFERENCE TO RELATED APPLICATION

This application claims priority under 35 USC 119 from Japanese patent document, 2005-339201, the disclosure of which is incorporated by reference herein.

BACKGROUND

1. Technical Field

This invention generally relates to a speaker predicting apparatus and a speaker predicting method.

2. Related Art

In recent years, with higher speed and higher capacity of the communications line, the importance of teleconferencing system has been increasingly focused on. In a teleconferencing system, a conference or meeting can be held by connecting multiple sites located remotely to send and receive image signals and sound signals. Teleconferencing systems are favorable from a financial standpoint, because conference participants do not have to move between the remote sites. Also, as compared to a simple voice communication, the teleconferencing systems serve many uses as a communication tool, because the amount of information that can be sent and received is greatly increased.

Conventionally, in order to specify the speaker in one of the conference rooms and selectively send the images and sounds of the speaker, an operator is needed for selectively changing cameras and a camera direction to capture the images and selectively changing microphones to collect the sounds. In a similar manner, when there are multiple participants in another conference room, another operator is also needed for a similar operation in another conference room.

Under the circumstances, there has been proposed a teleconferencing system, by which it is possible to identify the speaker on the basis of the information on the image being captured. In this technique, an image of a face of a participant is extracted and a movement of lips thereof is captured in the image of the face, so as to detect a pre-action before speaking. Accordingly, the participant who is going to speak is identified as a speaker.

However, in the a fore-described technique, the pre-action before speaking is detected. It is difficult to detect the speech or remarks before the speaker actually starts speaking.

SUMMARY

The present invention has been made in view of the above circumstances and provides a speaker predicting apparatus and a speaker predicting method that can predict a speaker before the speaker actually starts speaking.

According to an aspect of the invention, there is provided a speaker predicting apparatus including a speech detector that detects a person who is delivering a speech out of a plurality of persons; a feature extracting portion that extracts a feature in an image from the image in which the person is captured; a learning portion that learns the feature in the image occurring before the speech is detected by the speech detector, from the feature in the image; and a predicting portion that predicts the speaker out of the plurality of the persons, from the feature in the image in which the person is captured, with the use of a result learned by the learning portion.

BRIEF DESCRIPTION OF THE DRAWINGS

Embodiments of the present invention will be described in detail based on the following figures, wherein.

DETAILED DESCRIPTION

Figure 1:
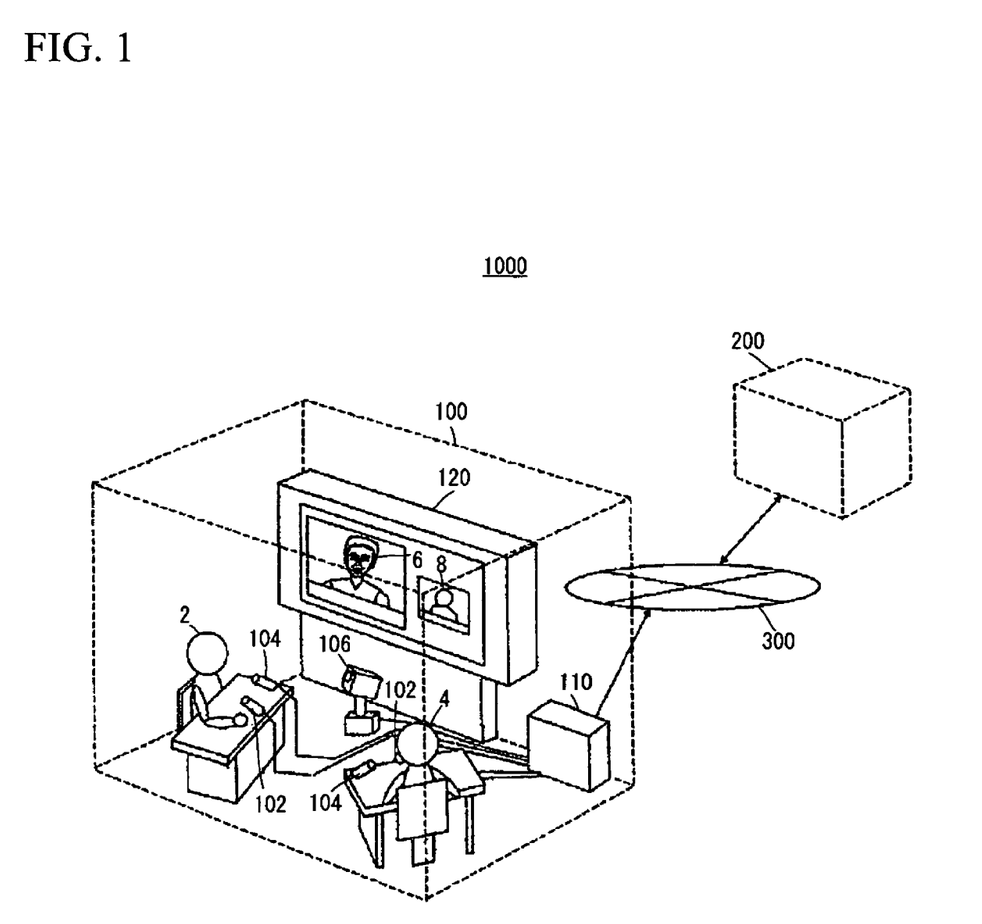
FIG. 1 is a schematic view illustrating a teleconferencing system according to an exemplary embodiment of the present invention.

A description will now be given, with reference to the accompanying drawings, of embodiments of the present invention. FIG. 1 is a schematic view illustrating a teleconferencing system 1000 according to an aspect of the present invention. In the teleconferencing system 1000 shown in FIG. 1, a communication is established between two conference rooms 100 and 200 on a public network 300 such as the Internet.

Here, more conference rooms where a conference is being held may be provided. However, a description hereafter will be given on the assumption that the teleconferencing is being held between two conference rooms, for simplification of description. Also, the network used to communicate between the two conference rooms may employ the public network 300 without change. An alternative system may be employed such that privacy of communications can be protected as needed by, for example, a virtual private network (VPN) realized on the public network 300.

In the conference room 100, for instance, there are two conference participants (persons) 2 and 4. Miniature cameras 102 and microphones 104 are respectively provided for the participants 2 and 4. The miniature camera 102 is an image-capturing portion that captures an image of the participant. Preferably, multiple miniature cameras provided for one participant. The microphone 104 serves as a detecting portion that detects a sound of the participant. A camera 106 whose image-capturing direction or the like is changeable according to a control signal may be provided to capture a scene in the conference room 100. In addition, there are provided a television 120 and a speaker predicting apparatus 110 in the conference room 100. The television 120 displays the image of participants 6 and 8 in another conference room 200, and outputs the sound of the participants 6 and 8.

The speaker predicting apparatus 110 specifies a speaker among the participants, and controls the miniature cameras 102 that capture the images of the participants and the microphones 104 that collect the sounds thereof to select the participant corresponding to the speaker. The speaker predicting apparatus 110 processes the image to be transmitted so that such specified speaker can be identified by the image displayed on the television in the conference room 200. Also in the conference room 200, there are provided, for example, two participants 6 and 8, as stated, whereas the number of the participants is not limited especially. A similar system as provided in the conference room 100 is also provided in the conference room 200.

The speaker predicting apparatus 110 learns a feature in the image occurring before speaking or making remarks during the conference from the features of the images in which the persons are captured, and predicts a speaker that begins delivering a speech or making remarks from the features of the images in which the persons are captured with the use of such learned results. Thus, by learning the feature in the image occurring before the speech, the speaker is predicted before the speaker begins to speak practically, according to such learned precedent, and the images and the microphones 104 are selectively changed.

Figure 2:
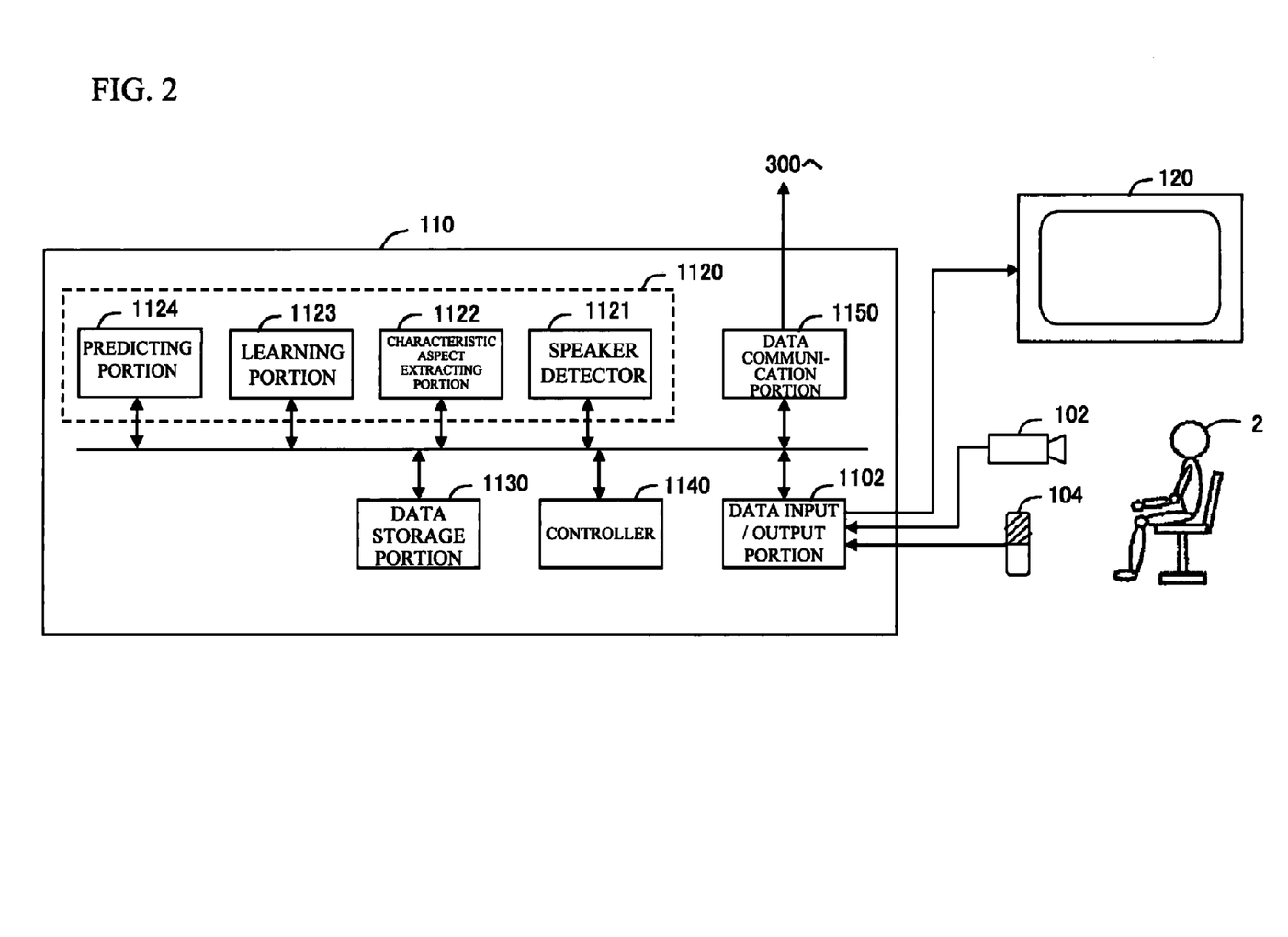
FIG. 2 schematically shows a block diagram illustrating a configuration of a speaker predicting apparatus according to an exemplary embodiment of the invention.

FIG. 2 schematically shows a block diagram illustrating a configuration of the speaker predicting apparatus 110 according to an aspect of the present invention. In FIG. 2, portions that relate to the participant 2 are extracted particularly from the configuration shown in FIG. 1. The speaker predicting apparatus 110 receives an image signal from the miniature camera 102 that captures the images of the participant 2 and a sound signal from the microphone 104 provided for the participant 2.

The speaker predicting apparatus 110 receives the image signal and the sound signal transmitted from the conference room 200 over the public network 300, displays a corresponding image on the television 120, and outputs a corresponding sound. The speaker predicting apparatus 110 receives the images and the sounds of the participants 2 and 4, processes the images and the sounds so that the participants 6 and 8 in the conference room 200 can identify the images and the sounds of the speaker, and transmits such processed images and sounds to the conference room 200 over the public network 300. In order to enhance a learning accuracy, preferably, multiple miniature cameras 102 and multiple microphones 104 is provided for capturing each participant, for capturing the participant 2 in the description hereafter.

A description will now be given of a configuration of the speaker predicting apparatus 110 in more detail. The speaker predicting apparatus 110 includes a data input/output portion 1102, a speaker extracting portion 1120, a data storage portion 1130, a controller 1140, and a data communication portion 1150. The data input/output portion 1102 is used to send and receive data with the miniature camera 102, the microphone 104, and the television 120. The speaker extracting portion 1120 performs a calculation to specify the speaker on the basis of the data received from the miniature camera 102. The data storage portion 1130 stores a program that specifies a process implemented by the speaker predicting apparatus 110 and various pieces of data used for speaker recognition and learning.

The controller 1140 controls the operation of the speaker predicting apparatus 110 according to the program stored in the data storage portion 1130, and processes the images and the like to be transmitted so that the image and sound of the speaker can be identified. The data communication portion 1150 transmits such processed image and sound data onto the public network 300, and receives the image signal and the sound signal transmitted from the conference room 200 on the public network 300.

The speaker extracting portion 1120 includes a speaker detector 1121 that serves as a speech detector, a feature extracting portion 1122, a learning portion 1123, and a predicting portion 1124. The speaker detector 1121 detects speech or remarks on the basis of the image in which the participant 2 is captured and the sound which is detected from the participant 2. The speaker detector 1121 also specifies the speaker with the use of a speaker recognition technique. The feature extracting portion 1122 extracts a feature of the image with the use of the image in which the participant 2 is captured. At this time, the feature extracting portion 1122 extracts the feature of the image by implementing Fourier transformation of the image data in which the participant 2 is captured. The feature extracting portion 1122 extracts the feature of the sound with the use of the sound which is detected from the participant 2. At this time, for example, the feature extracting portion 1122 extracts the feature of the sound by implementing Fourier transformation of the sound and image data, which is detected from the participant 2.

The learning portion 1123 learns the feature of the image occurring before the speech or remarks from the feature of the image in which the participant 2 is captured. More specifically, the learning portion 1123 obtains a probability P that the participant 2 begins a speech X at the time of a feature Y in the image occurs, with the use of the feature of the image in which the participant 2 is captured. Then, the learning portion 1123 learns the feature of the image occurring before the speech, with the use of the probability P.

$$P(X|Y) \tag{1}$$

Here, an expression (1) represents the probability P that X occurs when Y occurs.

The learning portion 1123 may specify a habit (event) of the participant 2 with the feature of the image in which the participant 2 is captured, and may learn the habit occurring before the speech from the habit of the participant 2. As examples of the habits detected from the image, loosening the mouth slightly (taking in breath), closing the mouth strongly and tightly, waiting with the mouth open, blinking eyes, making dimples on cheeks, inclining the head, raising an arm, standing up, turning up (down) corners of the mouth symmetrically/asymmetrically, gazing unstably, and staring at a speaker. In addition, a sound can be observed such as clicking the tongue. The learning portion 1123 learns from multiple classification analysis or neural network.

The predicting portion 1124 predicts a speaker who is going to speak from the participants 2 and 4 with the use of the features of the images in which the participant 2 is captured, according to the learned results of the learning portion 1123. The learning portion 1123 further learns the feature of the sound occurring before the speech or remarks from the feature of the sound that is detected from the participant 2. The predicting portion 1124 may predict may predict the speaker who is going to speak from the participants 2 and 4 with the use of the learned results of the learning portion 1123 and the feature of the sound that is detected from the participant 2.

As stated heretofore, the image transmitted to the conference room 200 through the public network 300 is processed in such a manner that the participants 6 and 8 in the conference room 200 can identify the images and the sounds of the speaker out of the participants 2 and 4 in the conference room 100. As a first method of processing the image, it is possible to selectively change to the image signal that corresponds to one of the participants completely, from among the image signals captured by the miniature cameras 102, so as to show only the speaking participant on the display, while at least the speaker is speaking.

In the afore-described case, the sound signal transmitted to the conference room 200 is generated on the basis of the signal fed by the microphone 104 provided for the participant 2, while the participant 2 is speaking. While no one is speaking, the sound signal may be transmitted by a microphone, not shown, which collects the sounds of the whole conference room 100. With respect to the image, when the speaker begins speaking once, for example, when the participant 2 begins speaking, the image of the participant 2 is displayed on the whole screen of the television in the conference room 200. Even after the participant 2 finishes speaking, it is possible to control that the screen keeps on displaying the image of the participant 2 until another participant 4 begins speaking.

Figure 3:
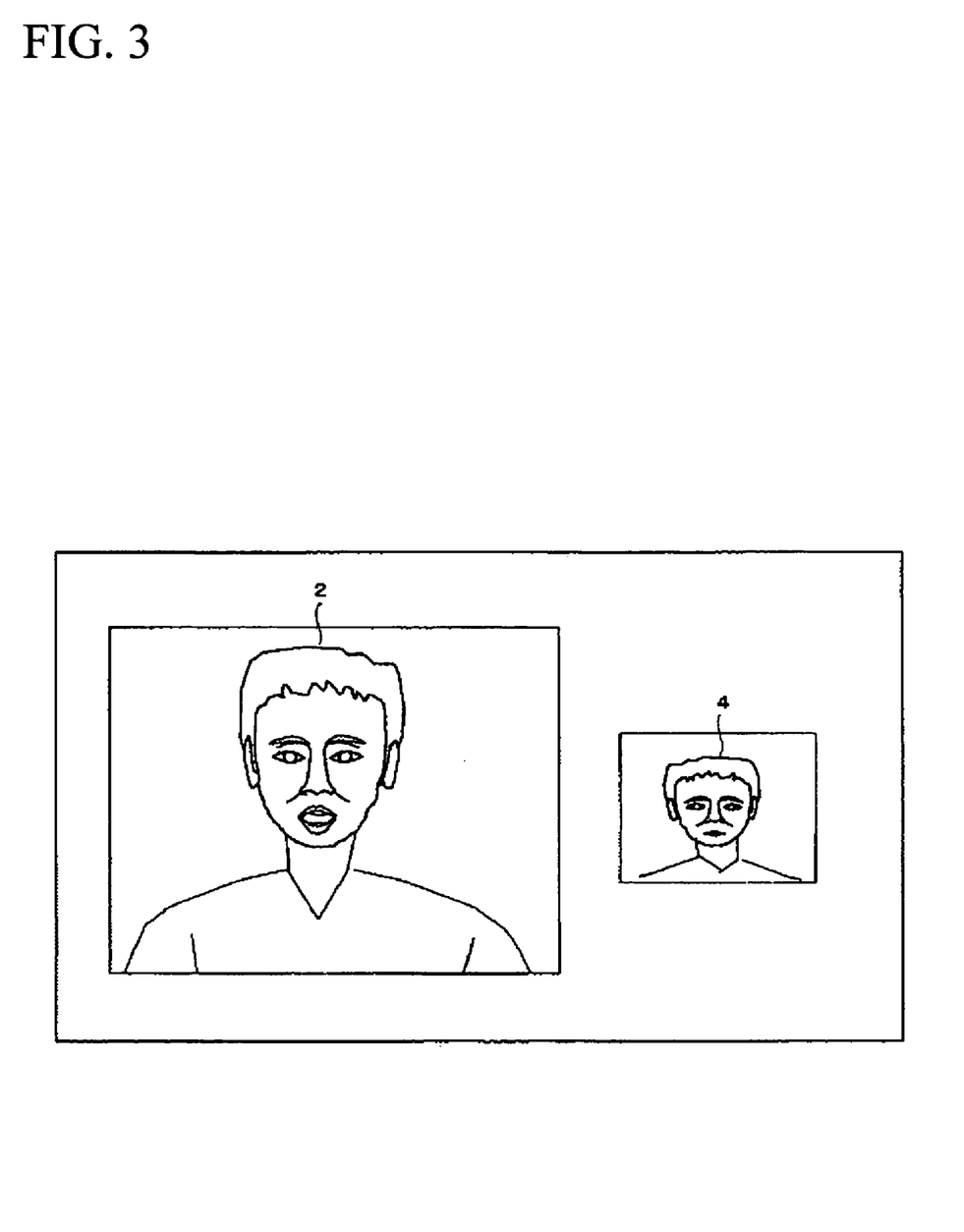
FIG. 3 is a schematic view illustrating a second method of processing the image that a controller transmits to the conference room.

FIG. 3 is a schematic view illustrating a second method of processing the image that the controller 1140 transmits to the conference room 200. In FIG. 3, images are shown to correspond to the image signals transmitted to the conference room 200. As the second method of processing the image, the participant who is speaking, for example, the participant 2 is processed to be displayed greater than the participant 4 who is not speaking on a screen, whereas the images of the participants 2 and 4 are always transmitted to the conference room 200. Here, a similar method as described in the first method may be employed for the selective change of the sound signals.

In the afore-mentioned case, when the participant 2 begins speaking once, the image of the participant 2 is displayed relatively large on the screen of the television in the conference room 200, while the participant 2 is speaking. When the participant 2 finishes speaking, the image of the participant 2 is displayed as large as the other participant 4. If the image of the speaker can be specified out of the participants 2 and 4, the method of processing the image is not limited to the above-described first and second ones. For instance, a speaker display area is predetermined on the display screen, and all the participants of the conference room 100 are displayed in an area other than such predetermined speaker display area on the screen of the television in the conference room 200. When one of the participants begins speaking, the image of the speaker may be moved and displayed in the afore-mentioned speaker display area.

Figure 4:
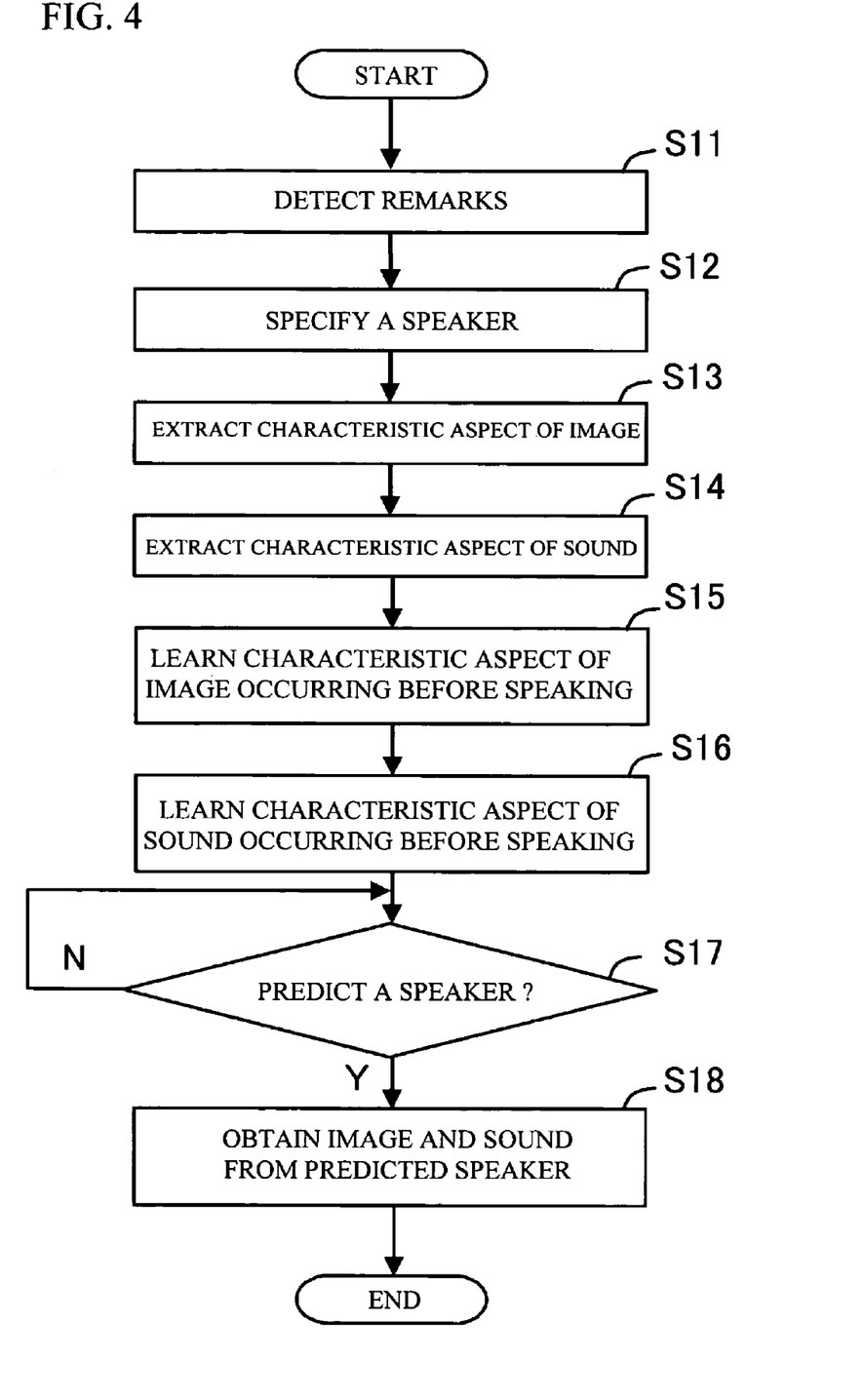
FIG. 4 is a flowchart of an operation example 1 of the speaker predicting apparatus according to an exemplary embodiment of the present invention.

Next, a description will be given of exemplary learning and operation of the speaker predicting apparatus in a case where the feature of the image and that of the sound are utilized. FIG. 4 is a flowchart of an operation example 1 of the speaker predicting apparatus. At step S11, the speaker detector 1121 detects the remarks on the basis of the image in which the participant is captured and the sound which is detected from the participant. At step S12, the speaker detector 1121 specifies the speaker with the use of the speaker recognition technique. At step S13, the feature extracting portion 1122 extracts the feature of the image from the image in which the participant is captured. At step S13, the feature extracting portion 1122 extracts the feature of the image from the image in which the participant is captured. At this time, for example, the feature extracting portion 1122 extracts the feature of the image by performing Fourier transformation on the image data in which the participant is captured.

At step S14, the feature extracting portion 1122 extracts the feature of the sound which is detected from the participant. At this time, for example, the feature extracting portion 1122 extracts the feature of the sound by performing Fourier transformation on the sound and image data which is detected from the participant. At step S15, the learning portion 1123 learns the feature of the image occurring before the speech from the feature of the speaker and the image in which the speaker is captured. At this time, the learning portion 1123 calculates the possibility that the participant speaks when the feature of the image occurs with the use of the feature in the image in which the participant is captured, and learns the feature occurring before the speech according to the probability.

At step S16, the learning portion 1123 further learns the feature of the sound occurring before the speech from the feature detected from the speaker. At this time, the learning portion 1123 calculates the possibility that the participant speaks when the feature of the sound occurs from the feature in the sound which is extracted from the participant, and learns the feature occurring before the speech with the use of the probability. The learning portion 1123 performs the aforedescribed learning on all the participants. At step S17, the predicting portion 1124 predicts a speaker who is going to speak out of the conference participants, with the use of the feature of the image in which the participant is captured and the feature of the sound that is detected from the participant, according to the results learned by the learning portion 1123. At step S18, the controller 1140 controls to selectively obtain the image and the sound of the participant predicted by the predicting portion 1124. This enables to recognize the speaker in advance, enabling the camera work and sound collection automatically.

According to the operation example 1, it is possible to predict the speaker before the speaker actually begins to speak on the basis of the learned precedent by learning the feature of the image and that of the sound occurring before the speaker actually begins to speak. According to the operation example 1 of the speaker predicting apparatus, a description has been given of a case where the feature of the image and that of the sound are used together. However, only the feature of the image may be used.

Figure 5:
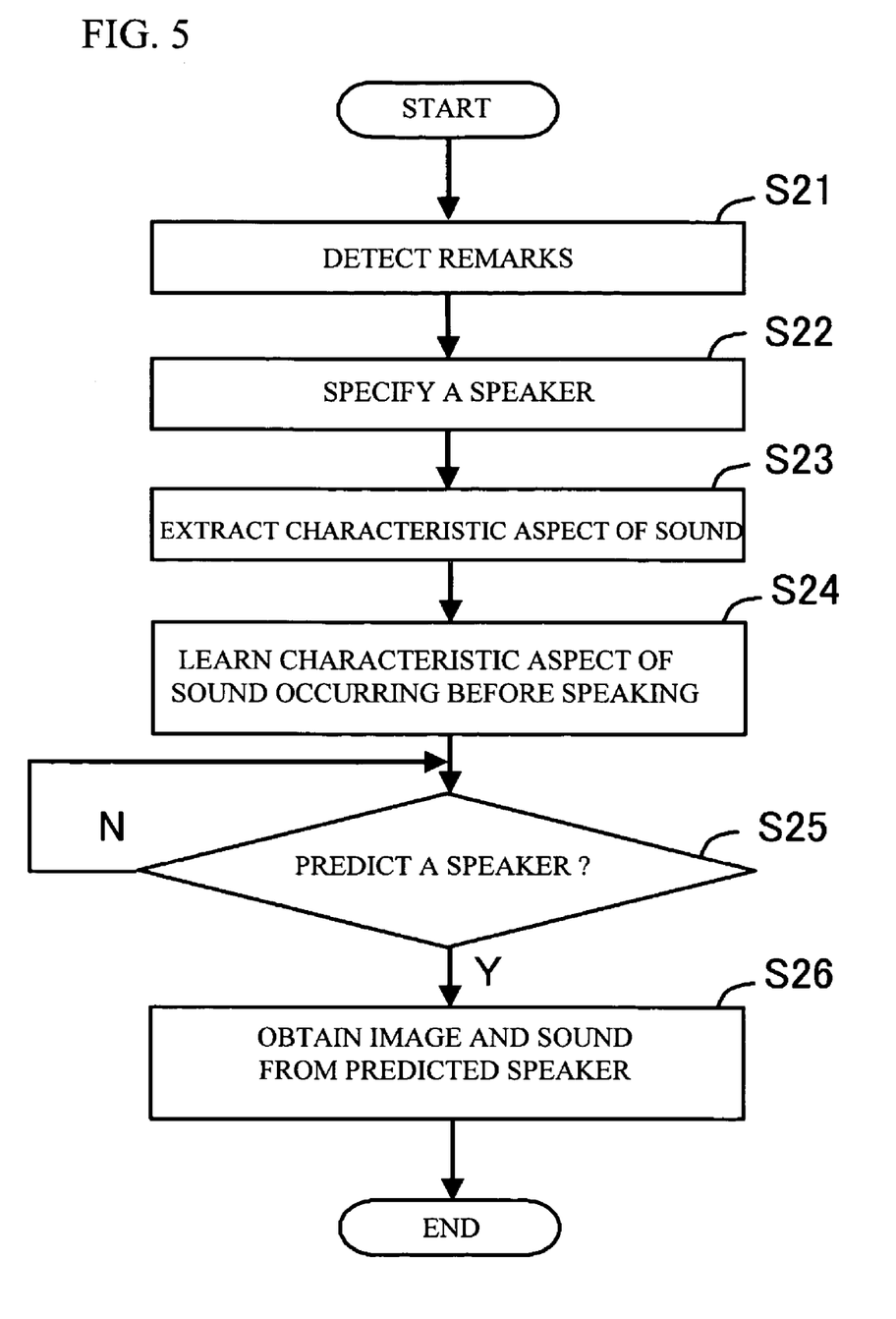
FIG. 5 is a flowchart of an operation example 2 of the speaker predicting apparatus according to an exemplary embodiment of the present invention.

Next, a description will now be given of a case where only the feature of the sound is used for learning. FIG. 5 is a flowchart of an operation example 2 of the speaker predicting apparatus. At step S21, the speaker detector 1121 detects the speech or remarks on the basis of the sound that is detected from the participant. At step S22, the speaker detector 1121 specifies the speaker with the use of the speaker recognition technique. At step S23, the feature extracting portion 1122 extracts the feature of the sound from the sounds which are extracted from the participant. For example, the feature extracting portion 1122 extracts the feature of the sound by performing Fourier transformation on the sound data that is detected from the participant. However, alternative method other than Fourier transformation may be employed for the method of extracting the feature of the sound.

At step S24, the learning portion 1123 learns the feature of the sound occurring before the speech. At this time, the learning portion 1123 calculates the probability that the participant speaks when the feature of the sound occurs from the feature of the sound that is extracted from the participant, and learns the feature occurring before the speech with the use of the probability. The learning portion 1123 performs the aforedescribed learning on all the participants. At step S25, the predicting portion 1124 predicts a speaker who is going to speak out of the conference participants, from the features of the sounds that are extracted from the participants, with the use of the results learned by the learning portion 1123.

At step S26, the controller 1140 controls to selectively obtain the image and the sound of the speaker predicted by the predicting portion 1124. This enables to recognize the speaker in advance, enabling the camera work and sound collection automatically. According to the operation example 2, it is possible to predict the speaker before the speaker actually begins to speak on the basis of the learned precedent by learning the feature of the sound occurring before the speaker actually begins to speak.

Figure 6:
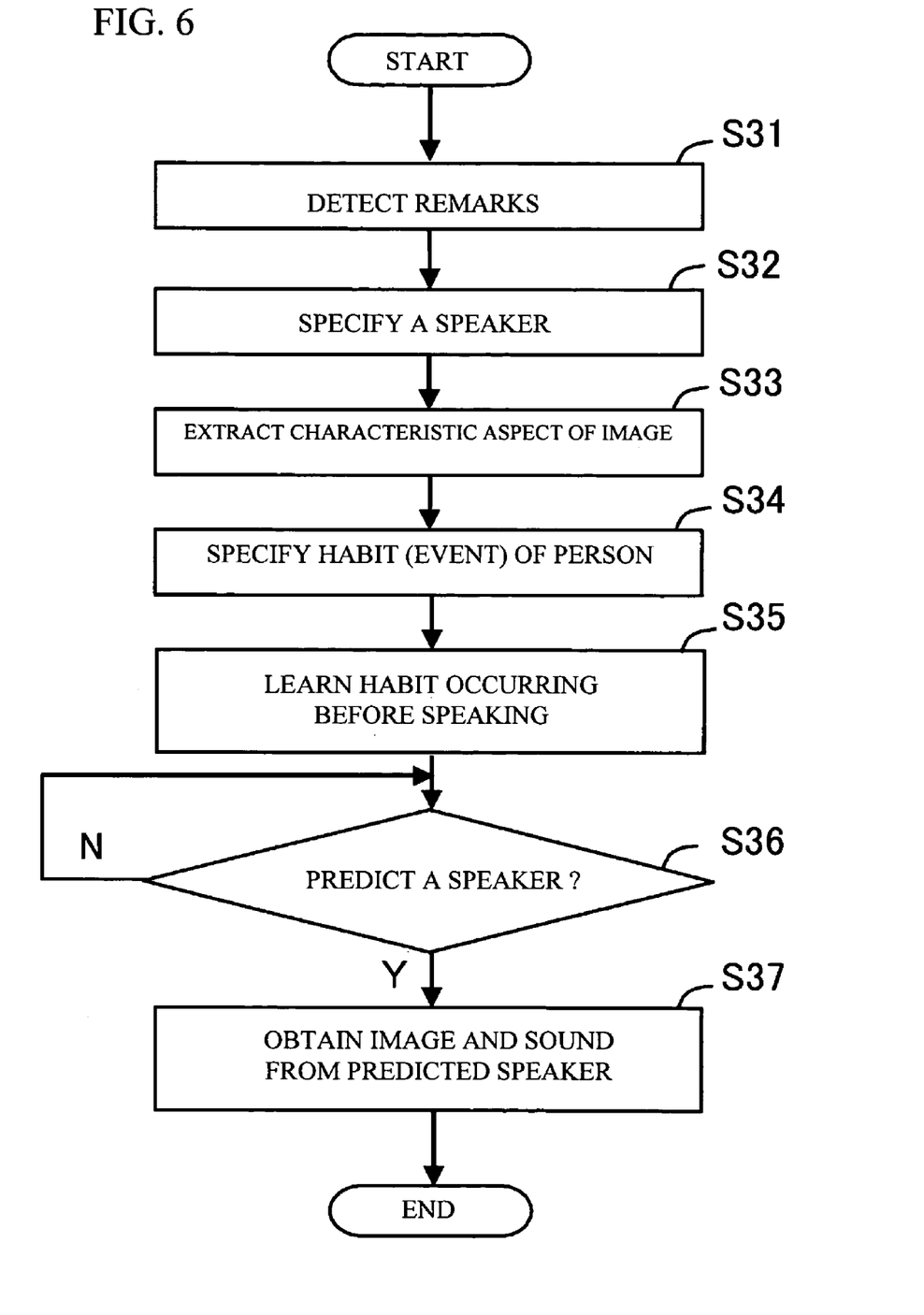
FIG. 6 is a flowchart of an operation example 3 of the speaker predicting apparatus according to an exemplary embodiment of the present invention.

According to the above-described operation examples 1 and 2, it is configured in such a manner that the speaker is predicted with the direct use of the features of the images and/or those of the sounds. However, according to an operation example 3 to be described hereafter, only a habit (event) is specified from the features of the images and the sounds of the participants, to predict a speaker on the basis of such habit. In the operation example 3, a description will be given of a case where only the feature of the image is exemplarily described. However, in a similar manner as described in the operation example 1, the feature of the sound may be employed.

FIG. 6 is a flowchart of an operation example 3 of the speaker predicting apparatus. At step S31, the speaker detector 1121 detects the remarks on the basis of the images in which the participants are captured and the sounds that are detected from the participants. At step S32, the speaker detector 1121 specifies the speaker with the use of the speaker recognition technique. At step S33, the feature extracting portion 1122 extracts the feature of the image from the images in which the participants are captured. At this time, for example, the feature extracting portion 1122 extracts the feature of the image by performing Fourier transformation on the image data in which the participant is captured.

At step S34, the learning portion 1123 specifies the habit of the participant from the feature extracted by the feature extracting portion 1122. At step S35, the learning portion 1123 learns the habit occurring before the participant begins to speak with the use of the habit of the participant. At this time, the learning portion 1123 calculates the probability that the participant speaks when the habit occurs, and learns the habit occurring before the speech with the use of the afore-described probability. The learning portion 1123 performs the afore-described learning on all the participants.

At step S36, the predicting portion 1124 predicts a speaker who is going to speak out of the conference participants from the feature of the image in which the participant is captured, with the use of the results learned by the learning portion 1123. At step S37, the controller 1140 controls to selectively obtain the image and the sound of the speaker predicted by the predicting portion 1124. This enables to recognize the speaker in advance, thereby enabling the camera work and sound collection automatically. According to the operation example 3, it is possible to predict the speaker before the speaker actually begins to speak on the basis of the learned precedent by learning the habit occurring before the speaker actually begins to speak.

As stated in the operation examples, it is possible to predict a speaker before the speaker actually begins to speak on the basis of the learned precedent, thereby specifying the speaker at an earlier timing and selectively changing the image and the sound. According to an exemplary embodiment of the present invention, a description has been given of a teleconferencing system in which a participant who is going to make remarks or delivering a speech is specified out of multiple participants in one of the conference rooms, and the image and the sound to be transmitted to the other conference room are selectively changed. However, the speaker predicting apparatus 110 is not limited to the afore-described case. The speaker predicting apparatus 110 may be applicable to a case where a conference is held in one venue in such a manner that the images of the conference attended by multiple participants are recorded and the sounds and images are selectively changed according to the speaker.

In addition, the speaker detector 1121 may be provided with a function that estimates a sound source to associate with a location where the feature in the image occurs. This makes it possible to estimate, for example, the location of the mouth or that of the face. As an event occurring before speech or remarks, a behavior of opening the mouth to prepare for speaking can be observed (when the mouth is opened, such opened portion slightly gets dark, a given feature can be observed with the value after Fourier transformation, and the like). A movement of facing up can be observed by a position of gravity center in a face area. A movement of raising an arm can be observed by a position of gravity center in a flesh-colored area. A movement of opening the mouth can be observed by an optical flow in the flesh-colored area.

Conventionally, there has been a research in which a face is detected from an image, a position of the mouth on the face is estimated, and speaking is predicted and detected by detecting the movements thereof (Kazumasa Murai and Satoshi Nakamura, "Face Detection for Multimodal Speech Recognition" Information Processing Society of Japan, Special Interest Group of Spoken Language Processing, Vol. 2002, No. 10. pp. 39-44, 2002 Feb. 1, 2002). This conventional method does not function properly, unless each of the positions is correctly recognized and detected. Therefore, the lighting condition and the positional relationship between the camera and the face have to be set appropriately. Learning is not employed in the afore-described conventional method; it is, however, difficult to implement the method in practice. In contrast, according to an exemplary embodiment of the present invention, even if there is a false recognition, an event can be associated with something after any event occurs, making it easy to realize. Whereas learning is necessary, learning gradually functions well while being used. This eliminates the necessity that the user has to operate, and eliminates the necessity of explicit arrangement or preparation of learning.

Even if the recognition technique is not fully mature, it is possible to apply the technique, by associating the speech with the feature of the image that can be easily detected, such as a case where teeth can be seen from the mouth or a case where the mouth is opened and the inside thereof gets dark, instead of the recognition of "opening the mouth". In most cases, a feature of the image appears on the position of the mouth and periphery thereof. Learning is possibly facilitated and the accuracy is possibly improved by associating the positional information on the sound source in speaking and the feature of the image. It is possible to estimate the sound source by employing a microphone array. It is also possible to improve the accuracy in the recognition of the face image and the recognition of the mouth. It is possible to reduce the calculation amount and enhance robustness.

A sophisticated recognition technique is needed to recognize an event where stares are focused on a next speaker from the image, and the lighting condition has to be considered. However, as stated above, it is assumed that learning is implemented on the scene. Accordingly, there is a possibility that a feature coincidentally occurring, for example, when a participant A faces a participant B, the image gets dark because hair occupies the display, can be recognized in a simple method, according to the lighting condition on the scene, arrangement of the participants, and the positional relationship with the participants and the camera.

If the position of the head of the participant A (a state of a specific position in the image even if the head of the participant A is not recognized) gets dark and the participant B begins speaking and a similar situation occurs again, it is possible to recognize that there is a possibility that the participant B is going to speak. Thus, it is possible to make a prediction by integrating the similar situation, namely, the integration of probability. It can be supposed that the image information is obtained by multiple cameras. Similarly, in a case where remarks are made by raising an arm, it is possible to easily observe the situation that there is a high possibility that the remarks are to be made near the position where the hue or brightness of color is changed due to the feature of the image such as the light, clothing, background color, and the like on the scene. It is possible to obtain the probability that a voice is uttered next.

Even if the prediction ends in failure, any fatal adverse effect cannot be presumed, because it is possible to provide a function that the camera faces to a direction of the speaker, once the speech is actually detected. In an actual conference, there are some cases where the participants are waiting for someone's statement. In the afore-described cases, if there is someone who is going to say words, the camera (that captures the image) faces to the direction, thereby promoting the remarks. Although there is a false recognition, if such false recognition promotes someone's remarks, the conference can be continued in a smooth manner. Even if there is a false recognition, there is no adverse effect, and in some cases, a side effect may be obtainable.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A speaker predicting apparatus comprising:
   a speech detector that detects a person who is delivering a speech out of a plurality of persons;
   a feature extracting portion that extracts a feature in an image from the image in which the person is captured;
   a learning portion that learns the feature in the image occurring before the speech is detected by the speech detector, from the feature in the image; and
   a predicting portion that predicts the speaker out of the plurality of the persons, from the feature in the image in which the person is captured, with the use of a result learned by the learning portion,
   wherein the speech detector estimates a sound source to associate with a location where the feature in the image occurs.

2. The speaker predicting apparatus according to claim 1, wherein the learning portion specifies an event of the person from the feature in the image in which the person is captured, and learns the event occurring before the speech with the use of the event of the person.

3. The speaker predicting apparatus according to claim 2, wherein the event includes at least one of loosening a mouth slightly to take in breath, closing the mouth strongly and tightly, waiting with the mouth open, blinking eyes, making dimples on cheeks, inclining a head, raising an arm, standing up, turning up or down corners of the mouth symmetrically or asymmetrically, gazing unstably, staring at a speaker, looking around other participants, and clicking a tongue.

4. The speaker predicting apparatus according to claim 1, wherein the learning portion obtains a probability that the person whose image is captured delivers the speech when the feature in the image occurs, with the use of the image in which the person is captured, and learns the feature in the image occurring before the speech with the use of the probability.

5. The speaker predicting apparatus according to claim 1, wherein the speech detector detects the speech of the person on the basis of at least one of the image in which the person is captured and the sound that is detected from the person.

6. The speaker predicting apparatus according to claim 1, wherein the feature extracting portion extracts the feature in the image by performing Fourier transformation on image data in which the person is captured.

7. The speaker predicting apparatus according to claim 1, further comprising a plurality of image-capturing portions that capture images of the person.

8. The speaker predicting apparatus according to claim 1, wherein:
   the learning portion further learns the feature of a sound occurring before the speech from the feature of the sound that is detected from the person; and
   the predicting portion predicts the speaker who is going to start delivering the speech out of the persons, from the feature in the image in which the person is captured and the feature of the sound that is detected from the person, with the use of a result learned by the learning portion.

9. A speaker predicting apparatus comprising:
   a speech detector that detects a person who is delivering a speech out of a plurality of persons;
   a feature extracting portion that extracts a feature of a sound from the sound of the person;
   a learning portion that learns the feature of the sound occurring before the speech is detected by the speech detector, from the feature of the sound; and
   a predicting portion that predicts the speaker out of the plurality of the persons, from the feature of the sound that is extracted from the person, with the use of a result learned by the learning portion,
   wherein the speech detector estimates a sound source to associate with a location where the feature in the sound occurs.

10. The speaker predicting apparatus according to claim 8, further comprising a controller that selectively obtains at least one of the image and the sound of the speaker predicted by the predicting portion.

11. A speaker predicting comprising:
    detecting that a person who is delivering a speech out of a plurality of persons;
    extracting a feature in an image from the image in which the person is captured;
    estimating a sound source to associate with a location where the feature in the image occurs;
    learning the feature in the image occurring before the speech is detected by the speech detector, from the feature in the image; and
    predicting the speaker out of the plurality of the persons, from the feature in the image in which the person is captured, with the use of a result learned by the learning portion.

12. The speaker predicting method according to claim 11, wherein learning specifies an event of the person from the feature in the image in which the person is captured, and learns the event occurring before the speech with the use of the event of the person.

13. The speaker predicting method according to claim 11, wherein learning obtains a probability that the person whose image is captured delivers the speech when the feature in the image occurs, with the use of the image in which the person is captured, and learns the feature in the image occurring before the speech with the use of the probability.

14. The speaker predicting method according to claim 11, wherein:
   learning further learns the feature of a sound occurring before the speech from the feature of the sound that is detected from the person; and
   predicting predicts the speaker who is going to start delivering the speech out of the persons, from the feature in the image in which the person is captured and the feature of the sound that is detected from the person, with the use of a result learned by the learning portion.

15. A speaker predicting method comprising:
   detecting that a person who is delivering a speech out of a plurality of persons;
   extracting a feature of a sound from the sound of the person;
   estimating a sound source to associate with a location where the feature in the sound occurs;
   learning the feature of the sound occurring before the speech is detected by the speech detector, from the feature of the sound; and
   predicting the speaker out of the plurality of the persons, from the feature of the sound that is extracted from the person, with the use of a result learned by the learning portion.

16. A non-transitory computer readable medium storing a program causing a computer to execute a process for predicting a speaker, the process comprising:
   detecting that a person who is delivering a speech out of a plurality of persons;
   extracting a feature of a sound from the sound of the person;
   estimating a sound source to associate with a location where the feature in the sound occurs;
   learning the feature of the sound occurring before the speech is detected by the speech detector, from the feature of the sound; and
   predicting the speaker out of the plurality of the persons, from the feature of the sound that is extracted from the person, with the use of a result learned by the learning portion.

* * * * *